United States Patent
Lantoine et al.

(10) Patent No.: US 7,907,720 B2
(45) Date of Patent: Mar. 15, 2011

(54) TEST METHOD FOR LINE EQUIPMENT INCLUDING A HYBRID CIRCUIT AND LINE EQUIPMENT FOR ITS IMPLEMENTATION

(75) Inventors: Eric Lantoine, Lannion (FR); Christophe Henry, Pleumeur Bodou (FR); Jean Paul Duval, Lannion (FR)

(73) Assignee: Alcatel-Lucent, Paris (FR)

( * ) Notice: Subject to any disclaimer, the term of this patent is extended or adjusted under 35 U.S.C. 154(b) by 1716 days.

(21) Appl. No.: 11/119,829

(22) Filed: May 3, 2005

(65) Prior Publication Data

US 2005/0250351 A1    Nov. 10, 2005

(30) Foreign Application Priority Data

May 4, 2004    (FR) ..................................... 04 04785

(51) Int. Cl.
*H04M 1/00*    (2006.01)
(52) U.S. Cl. ........ 379/385; 379/378; 379/380; 379/381; 379/382; 379/22; 379/27.01
(58) Field of Classification Search ........... 379/350–386
See application file for complete search history.

(56) References Cited

U.S. PATENT DOCUMENTS

| | | | | |
|---|---|---|---|---|
| 5,881,129 A | * | 3/1999 | Chen et al. | ................. 379/26.02 |
| 6,219,417 B1 | * | 4/2001 | Zhou | ............................ 379/377 |
| 2002/0094077 A1 | * | 7/2002 | Kunisch | ................... 379/387.01 |
| 2005/0250351 A1 | * | 11/2005 | Lantoine et al. | ................ 439/49 |

FOREIGN PATENT DOCUMENTS

| | | |
|---|---|---|
| EP | 0 352 040 A | 1/1990 |
| EP | 0 808 053 A | 11/1997 |
| EP | 1 107 552 A | 6/2001 |

* cited by examiner

*Primary Examiner* — Simon Sing
*Assistant Examiner* — Ibraham Sharifzada
(74) *Attorney, Agent, or Firm* — Harness, Dickey & Pierce, P.L.C.

(57) ABSTRACT

The invention relates to methods for testing analog telephone line equipment including, in particular to detect faults in their hybrid resistor arrays.
It consists in isolating the equipment from the telephone line and then applying the normal ringing signal to it. If the resistor array is defective, the output logic signal of the off-hook/on-hook detector circuit comprises a succession of 0 and 1 at the frequency of the ringing signal, which indicates the fault. This makes it possible to eliminate the equipment test relay usually employed.

10 Claims, 2 Drawing Sheets

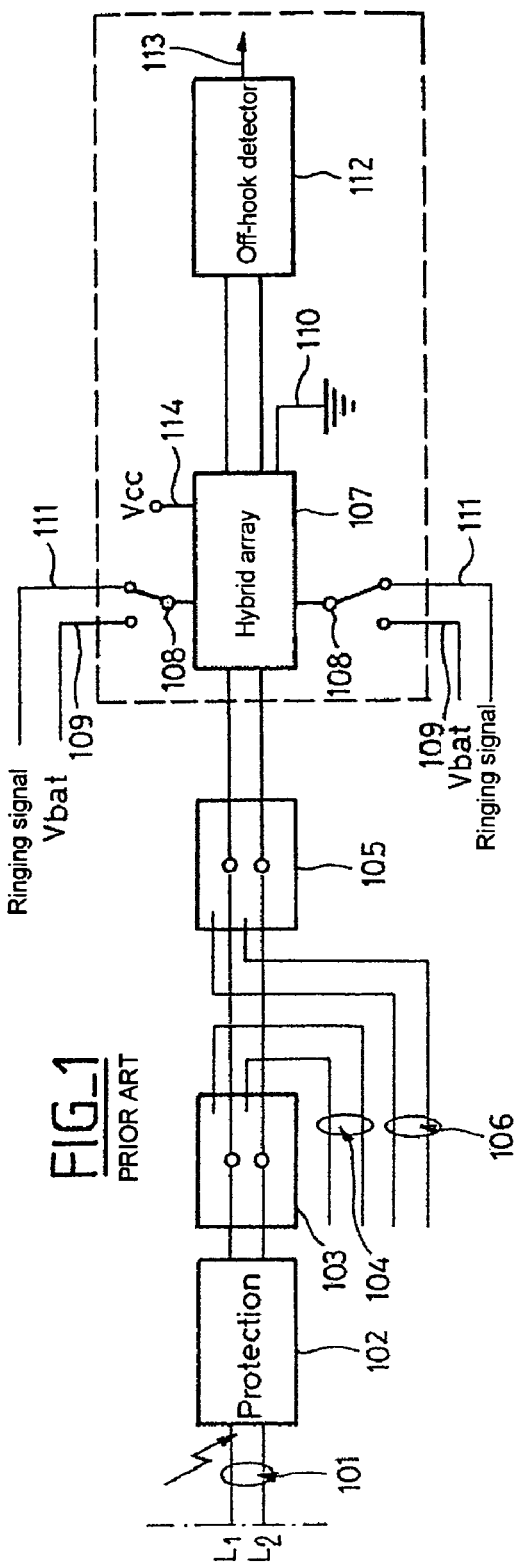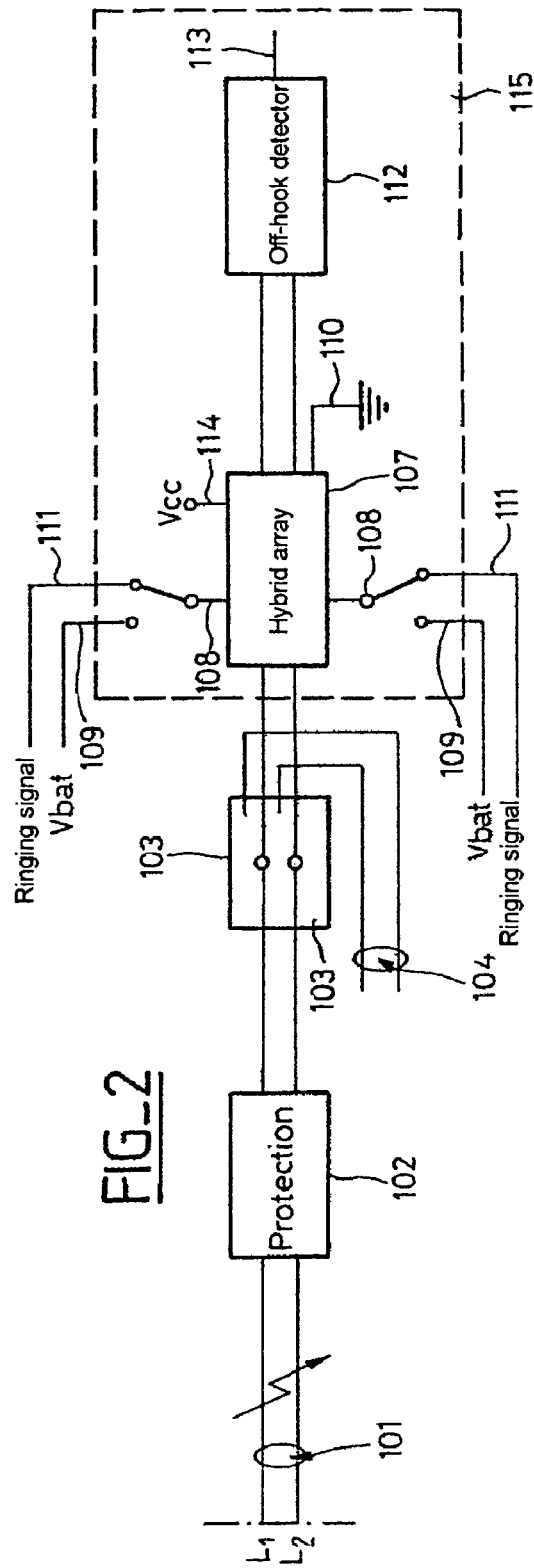

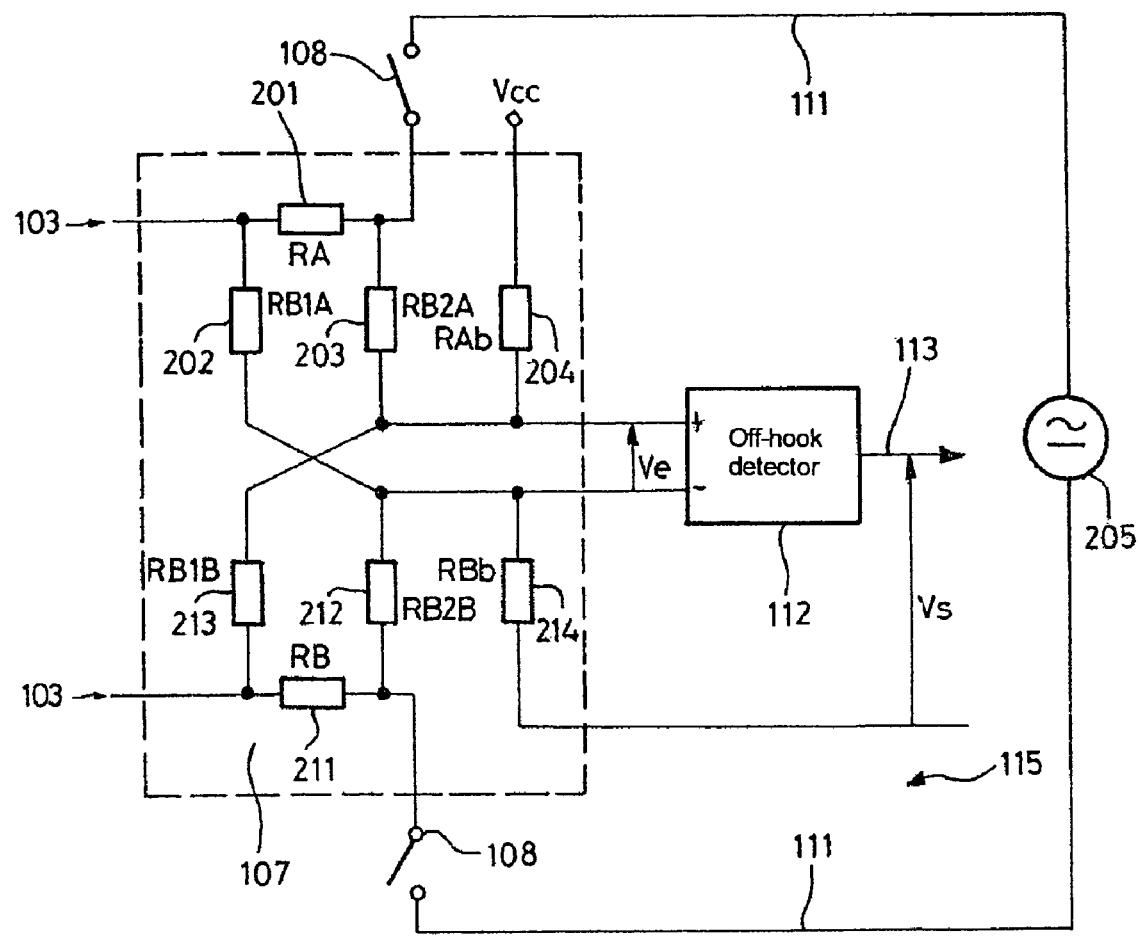
FIG_3

TEST METHOD FOR LINE EQUIPMENT INCLUDING A HYBRID CIRCUIT AND LINE EQUIPMENT FOR ITS IMPLEMENTATION

CROSS-REFERENCE TO RELATED APPLICATIONS

This application is based on French Patent Application No. 04 04 785 filed Apr. 05, 2004, the disclosure of which is hereby incorporated by reference thereto in its entirety, and the priority of which is hereby claimed under 35 U.S.C. §119.

BACKGROUND OF THE INVENTION

1. Field of the invention

The present invention relates to a method of testing telephone line equipment, more particularly equipment that includes an array of resistors, in particular a hybrid array of resistors, for effecting diverse functions such as powering the telephone line and limiting the ringing current. It also relates to a line equipment adapted to implement the method.

2. Description of the Prior Art

U.S. Pat. No. 6,219,417 describes an analog telephone line equipment including a hybrid resistor array and a signal processor that is also used to carry out tests, in particular when sending a ringing signal over the telephone line. However, it does not describe any test for checking the integrity of the hybrid resistor array.

The document EP 0 808 053 describes an analog telephone line equipment including a hybrid resistor array and a signal processor that is also used to carry out tests. It describes how to isolate the equipment from the telephone line while testing the equipment without using relays and a test for checking the integrity of the hybrid resistor array. The signal processor supplies a 1 kHz digital test signal to a codec which converts the signal into an analog signal which is injected into the hybrid resistor array. The signal reflected by the hybrid array is amplified by the telephone signal receiver amplifier, after which its amplitude is measured by the signal processor. Its amplitude depends on the load on each of the wires of the telephone line and on the state of the hybrid resistor array. If the array includes a resistor that is open circuit, the reflected signal has an amplitude above a fixed threshold, and the processor trips an alarm. The above test method has the drawback that it can be applied only to an equipment including a signal processor. However, a signal processor considerably increases the cost of a telephone line equipment.

FIG. 1 shows a conventional line equipment designed to be connected by a telephone line 101 to a basic telephone, i.e. a telephone that operates over an ordinary analog line, as opposed to new systems such as an ISDN or ADSL, for example. The lines and the units adapted to send and receive voice signals between the equipment and the local office are known in the art and are not shown, to simplify the figure and because they are not relevant to the invention.

The telephone line is connected at the input of the line equipment to an overvoltage protection device 102 of a type that is known in the art. The device 102 is connected to a line test relay 103 that is used to isolate the line equipment from the telephone line in order to connect it to a line test bus 104.

A second equipment test relay 105 is used to test the operation of the line equipment, in particular the on-hook/off-hook function, and more particularly the integrity of the hybrid resistor array 107, by isolating the input of the array 107 in order to connect it to an equipment test bus 106. Thus outside these test periods the relay 105 connects the line from the relay 103 to the input of the hybrid array 107.

The hybrid array 107, the detailed structure of which is described later, is connected through a ringing relay 108 either to a power supply circuit 109 or to a ringing circuit 111. In the present example, the circuit 109 is connected to two switching circuits of the relay and corresponds, for one of them, to the negative side of the power supply (Vbat) and, for the other of them, to the positive side of the power supply. However, as is known in the art, the negative side is the hot side and the positive side is connected to the general ground 110.

The control circuits for these various relays are known in the art and are therefore not shown in the figure.

The output of the hybrid array 107 is connected to a circuit 12 for detecting the off-hook or on-hook state of the telephone connected to the line equipment. A voltage Vcc applied to the hybrid array 107 via a connection 114 provides a bias voltage that is used by the circuit 112. If the on-hook state is detected, the circuit 112 sends a logic signal to an output connection 113. It sends a complementary logic signal if it detects the on-hook state.

Using a test relay 105 to test the hybrid array 107 generates a cost that is all the higher in that there are as many relays as there are line equipments and therefore telephones served by the system.

SUMMARY OF THE INVENTION

To reduce the above costs by eliminating the test relays, the invention proposes a test method that necessitates neither the test relay 105 nor a signal processor. It is characterized in that, to test the resistor array, it consists in:

isolating the equipment from the telephone line,
 applying the ringing signal, and
 analyzing the logic signal which, if the resistor array is defective, comprises a succession of 1 and 0 at the frequency of the alternating component of the ringing signal.

The invention also proposes an analog telephone line equipment for implementing the above method, that equipment comprising:

a resistor array adapted to couple the equipment to an analog telephone line,
 means between the resistor array and the telephone line for isolating the equipment from the telephone line,
 means for isolating the telephone line equipment,
 means for applying to the equipment a ringing signal including a low-frequency alternating component, and
 an off-hook/on-hook detector circuit delivering an off-hook/on-hook logic signal, including, for testing the hybrid resistor array, means for detecting if the logic signal comprises a succession of 1 and 0 at the frequency of the alternating component of the ringing signal.

According to another feature of the invention, the off-hook/on-hook detector circuit includes a comparator having two inputs connected to respective outputs of the resistor array which comprises two bias resistors connected to the inputs of the comparator to apply thereto a bias voltage whose value is significantly greater than a low-amplitude residual alternating voltage arising from the ringing signal if the resistor array is sound.

Other features and advantages of the invention will become clearly apparent in the course of the following description, which is given with reference to the appended drawings.

BRIEF DESCRIPTION OF THE DRAWINGS

FIG. 1 is a simplified diagram of a prior art line equipment.

FIG. 2 shows the FIG. 1 diagram modified in accordance with the invention.

FIG. 3 is a diagram of the components within the dashed-line frame 115 in FIG. 2.

DETAILED DESCRIPTION OF THE PREFERRED EMBODIMENT

FIG. 2 shows a line equipment for implementing the method of the invention. Note that this line equipment does not differ significantly from that represented in FIG. 1, except that the test relay 105 has been eliminated.

The method of the invention is explained with reference to the more detailed diagram of the components inside the dashed-line frame 115 in FIG. 3.

The hybrid circuit 107 energizes the relay 103 and therefore the telephone line via two current limiter resistors RA 201 and RB 211 that are in turn energized by the ringing relay 108. To simplify the diagram the energization circuit 109 is not shown.

A bridge formed by two resistors RB1A 202 and RB2B 212 in series between the input of the resistor RA and the output of the resistor RB and two resistors RB2A 203 and RB1B 213 in series between the output of the resistor RA and the input of the resistor RB determine the direction of the bias current which, as is known in the art, indicates either the off-hook state or the on-hook state of the telephone connected to the line equipment. To this end, the mid-points of the two branches of the bridge are connected to the positive and negative inputs of a comparator forming the essential component of the off-hook detector circuit 112 and whose output 113 delivers a voltage Vs that switches between 0 and X Volts when the input voltage Ve of the comparator changes direction, which corresponds to sending a 1 or 0 logic signal, as appropriate. Furthermore, a first bias resistor RAb 204 connects a power supply Vcc to the mid-point of the resistors RB2A and RB1B and a second bias resistor RBb 214 grounds the mid-point of the resistors RB1A and RB2B. This fixes the voltage Ve at a minimum value preventing instability of the comparator 112.

For the system to operate correctly, the values of the various resistors must satisfy the following conditions:

RA=RB<<RAb=RBb<<RB1A=RB1B=RB2A=RB2B

To test the line equipment, and more particularly its hybrid circuit, the invention proposes to disconnect the equipment from the line by means of the relay 103 and then to apply a ringing signal to it from a ringing signal generator 205 via the relay 108. This operation is effected simply by programming the control computer of the local office to which the line equipment is connected.

The applied ringing signal is preferably a signal known in the art comprising a DC component at −52 V on which is superposed a low-frequency alternating component at 80 $V_{rms}$.

When the resistors of the hybrid circuit have their nominal value, the low-frequency alternating component generates at the input of the circuit 112 only a residual alternating voltage of low amplitude, of the order of a few mV. That component is much lower than the bias voltage Ve, which prevents the comparator in the circuit 112 from changing state.

On the other hand, if any one of the resistors RB1A, RB2A, RB1B or RB2B of the hybrid circuit 107 is defective, i.e. if it is open circuit or short circuited or if its value has varied significantly, the value of the alternating component superposed on Ve exceeds the value of the initial bias voltage, which causes the comparator of the circuit 112 to change state at the frequency of the alternating component of the ringing signal. The circuit 112 therefore emits a logic signal consisting of a succession of 1 and 0 at the frequency of that alternating component, indicating the detection of a fault. The system is also able to detect an open circuit or a very significant increase in the value of the resistors RA and RB.

The above logic signal is totally different from the logic signal corresponding to an off-hook or on-hook operation which, once established, is a stable signal with no transitions. The control computer of the local office to which the line equipment is connected is therefore very easily able, by detecting this sequence, to determine that the hybrid circuit of the line equipment is defective. Once again, this detection is effected simply by programming the computer.

Thus the invention eliminates the test relay 105 of each line equipment as well as the bus and its associated electronics, at the cost of adding a few lines of code to the program of the computer of the local office to which all the line equipments are connected.

The invention is also applicable to line equipments in which the relays are replaced by semiconductor switching circuits.

There is claimed:

1. A test method for analog telephone line equipment including a resistor array adapted to couple said equipment to an analog telephone line, a first selector between said resistor array and said telephone line for isolating said equipment from said telephone line, a second selector for applying to said equipment a ringing signal, the second selector including a low-frequency alternating component, and an off-hook/on-hook detector circuit delivering an off-hook/on-hook logic signal, the method comprising:
   isolating said equipment from said telephone line,
   applying said ringing signal, and
   analyzing said logic signal which, if said resistor array is defective, includes a succession of 1 and 0 at the frequency of said alternating component of said ringing signal, the logic signal being based on a voltage comparison between at least a first bridge and a second bridge, the first bridge and the second bridge connecting two inputs of the resistor array.

2. Analog telephone line equipment comprising:
   a resistor array adapted to couple said equipment to an analog telephone line,
   a first selector between said resistor array and said telephone line for isolating said equipment from said telephone line,
   a second selector for applying to said equipment a ringing signal, the second selector including a low-frequency alternating component, and
   an off-hook/on-hook detector circuit delivering an off-hook/on-hook logic signal, the off-hook/on-hook detector circuit being configured to test said resistor array by detecting if said logic signal includes a succession of 1 and 0 at the frequency of said alternating component of said ringing signal, the logic signal being based on a voltage comparison between at least a first bridge and a second bridge, the first bridge and the second bridge connecting two inputs of the resistor array.

3. The equipment claimed in claim 2 wherein said isolating means connect said telephone line directly to said resistor array.

4. The equipment claimed in claim 2 wherein said off-hook/on-hook detector circuit includes a comparator having two inputs connected to respective outputs of said resistor array which includes two bias resistors connected to said inputs of said comparator to apply thereto a bias voltage whose value is significantly greater than a low-amplitude residual alternating voltage arising from said ringing signal if said resistor array is sound.

5. A method for testing resistor arrays in a communication system comprising:
   isolating a telephone line equipment from a telephone line at an input to a resistor array;
   applying said ringing signal to the resistor array;
   performing a voltage comparison between at least a first bridge and a second bridge, the first bridge and the second bridge connecting two inputs of the resistor array;
   generating a logic signal based on the voltage comparison, such that the logic signal includes a succession of 1 and 0 at a frequency of an alternating component applying the ringing signal if the resistor array is defective.

6. The method of claim 5, wherein the voltage comparison is between (i) a first point in at least a first bridge, and (ii) a second point in at least a second bridge.

7. The method of claim 6, wherein the first point is a first mid point of the first bridge and the second point is a second midpoint of the second bridge.

8. The method of claim 7, wherein the each of the first bridge and second bridge include resistors connected in series.

9. The method of claim 5, wherein the logic signal switches logic states based on a change of direction in the voltage comparison.

10. The method of claim 5, wherein the logic signal switches logic states based on presence of at least one of an open circuit, a short circuit, and a significant variation in value of the resistance array.

* * * * *